US 7,590,614 B2

(12) United States Patent
Fildebrandt et al.

(10) Patent No.: US 7,590,614 B2
(45) Date of Patent: Sep. 15, 2009

(54) METHOD, APPARATUS, AND COMPUTER PROGRAM PRODUCT FOR IMPLEMENTING TECHNIQUES FOR VISUALIZING DATA DEPENDENCIES

(75) Inventors: Ulf Fildebrandt, Schwetzingen (DE); Christian Georgi, Mannheim (DE); Jade Sripad, Karnataka (IN); Jens Baumgart, Dossenheim (DE)

(73) Assignee: SAP AG, Walldorf (DE)

( * ) Notice: Subject to any disclaimer, the term of this patent is extended or adjusted under 35 U.S.C. 154(b) by 465 days.

(21) Appl. No.: 10/734,735

(22) Filed: Dec. 11, 2003

(65) Prior Publication Data
US 2005/0131927 A1 Jun. 16, 2005

(51) Int. Cl.
*G06F 7/00* (2006.01)
*G06F 17/30* (2006.01)
(52) U.S. Cl. .......................... 707/1; 707/100; 707/102; 707/103 R; 707/103 Y; 707/103 Z
(58) Field of Classification Search ........................ 707/1
See application file for complete search history.

(56) References Cited

U.S. PATENT DOCUMENTS

| 6,360,223 B1 * | 3/2002 | Ng et al. .................... 707/100 |
| 6,859,821 B1 * | 2/2005 | Ozzie et al. ................ 709/205 |
| 6,952,620 B2 * | 10/2005 | Cherdron et al. ............. 700/30 |
| 6,968,535 B2 * | 11/2005 | Stelting et al. .............. 717/104 |
| 7,092,961 B2 * | 8/2006 | Minezaki et al. .......... 707/104.1 |
| 7,127,445 B2 * | 10/2006 | Mogi et al. .................... 707/1 |
| 2002/0107917 A1 * | 8/2002 | Pociu .......................... 709/203 |
| 2003/0236764 A1 * | 12/2003 | Shur ............................. 707/1 |
| 2005/0065951 A1 * | 3/2005 | Liston et al. ................ 707/101 |
| 2005/0138160 A1 * | 6/2005 | Klein et al. .................. 709/223 |

FOREIGN PATENT DOCUMENTS

EP 1510952 A1 * 3/2005

OTHER PUBLICATIONS

"A Framework for Mapping Traceability Relationships," by Susanne A. Sherba, Kenneth M. Anderson, and Maha Faisal, In Proceedings of the Second International Workshop on Traceability in Emerging Forms of Software Engineering (TEFSE'03), Montreal, Quebec, Canada, Oct. 7, 2003.*
"Development of process visualization systems: an object-oriented approach", by Szirmay-Kalos et al, Journal of Systems Architecture: the EUROMICRO Journal archive, vol. 46, Issue 3 (Jan. 2000), pp. 275-296, ISSN:1383-7621, Publishers Elsevier North-Holland Inc, New York, NY, USA.*

* cited by examiner

*Primary Examiner*—Tim T. Vo
*Assistant Examiner*—Jay A Morrison
(74) *Attorney, Agent, or Firm*—Finnegan, Henderson, Farabow, Garrett & Dunner, L.L.P.

(57) ABSTRACT

Methods and apparatus, including computer program products, implement techniques for visualizing data dependencies. A specification of a component encapsulating one or more controllers is received. Each controller has an associated data structure of data elements. The component includes one or more data mappings, where each data mapping is either a context mapping or a model mapping. A context mapping binds the data element to another data element. A model mapping specifies a supply function operable to derive a value of the data element from a model. A data dependency relationship is derived whenever there is at least one data mapping between the controller and another controller or a model. Each data dependency relationship is directed from a controller to one other controller or to one of the models. A data dependency relationship is visualized by displaying a link showing a direction of data dependency.

21 Claims, 13 Drawing Sheets

METHOD, APPARATUS, AND COMPUTER PROGRAM PRODUCT FOR IMPLEMENTING TECHNIQUES FOR VISUALIZING DATA DEPENDENCIES

BACKGROUND

The present invention relates to electronic data processing in general, and particularly to application programming.

Applications can be developed using various architectures, including, for example, a model-view-controller (MVC) architecture. The MVC architecture breaks an application into three separate parts-models, views, and controllers. Each model can have multiple views, where each view displays information about the model to a user. A controller of the model receives events, for example, raised by a user interacting with a view to manipulate the model. Each model can have multiple controllers, and a controller can relate to multiple views. The models and the controllers typically include application code. When changes occur in a model, the model updates its views. Data binding can be used for data transport between the view and its model or controller. For example, where a table view is defined to display data from a corresponding table stored in the model or controller, the table can be bound to and thus used as the data source for the table view. The table view can be replaced by a further view, such as a graph view, that binds against the same table. In this case, the further view can display the table data without changing anything in the controller or the model.

Application development is often divided into two general stages: design time and runtime. The design time stage can include steps such as designing the views of an application (including the layout of the user interface elements in each view), modeling of the application flow (including the selection of the views to displayed), designing one or more models, and creating and editing other application elements, such as controllers and contexts. The design time stage can also include the binding of user interface (UI) elements within the views to data sources that are defined in a data type repository.

Regardless of which architecture is used, it is often desirable to structure an application (including, for example, the models, views, and controllers that make up an MVC application) into reusable entities or components.

SUMMARY OF THE INVENTION

In general, in one aspect, the invention provides methods and apparatus, including computer program products, implementing techniques for visualizing data dependencies. The techniques include receiving a specification of a component including one or more data mappings, deriving one or more data dependency relationships from the data mappings, and visualizing the data dependency relationships by displaying a link for each data dependency relationship. The component encapsulates one or more controllers, where each controller has at least one associated data structure of data elements, each data structure being associated with exactly one controller. The component includes one or more data mappings, where each data mapping specifies a data source for a data element. Each data mapping is a context mapping or a model mapping. A context mapping binds the data element to another data element. A model mapping specifies a model and a supply function, where the supply function is operable to derive a value of the data element from the model. Each data dependency relationship is directed from a controller to one other controller or to one model. One data dependency relationship is derived whenever there is at least one data mapping between the controller and other controllers of the model. The direction of the link displayed for each data dependency relationship shows the direction of data dependency.

Advantageous implementations of the invention include one or more of the following features. The data structure can be a tree. The controllers can include at least one interface controller and at least one view controller. The controllers can also include a configuration controller, a component controller, or a custom controller. The techniques can further include receiving user input editing a link and modifying the data dependency relationship specified by the link in accordance with the user input, where the data dependency relationship is modified by modifying the data mappings such that the modified data mappings correspond to the user input. The data link can have a source end where the source end specifies the source of data for the data dependency relationship. Receiving user input, editing a link can include receiving user input moving the source end of the link from a first data source to a second data source, where the first and second data source are each either a controller or a model. Receiving user input editing a link can include receiving user input changing the direction of the data dependency relationship for the link. The techniques can further include receiving user input requesting a display of a detailed view of a link having a source and a destination and responding to the user input by displaying all the data mappings that have the same source and destination as the link. The techniques can further include receiving user input to filter the displayed links using a filter and displaying only data dependency relationships satisfying the filter. The filter can specify all data dependency relationships having selected models or controllers as the source. The filter can specify all the data dependency relationships having a selected controller as the source or the destination, or having a selected model as the source. The techniques can further include receiving user input to filter the data mappings using a filter, deriving one or more filtered data dependency relationships from the data mappings satisfying the filter, and visualizing the filtered data dependency relationships. The filter can specify all data mappings having selected models or controllers as the data source. The filter can also specify all data mappings having a selected controller or model as the data source, and all data mappings specifying a data source for the selected controller.

In another aspect, the invention provides a system including means for receiving a specification of a component including one or more data mappings, means for deriving one or more data dependency relationships from the data mappings, and means for visualizing the data dependency relationships by displaying a link for each of the data dependency relationships, where each link shows a direction of data dependency. The component encapsulates one or more controllers, where each controller has at least one associated data structure of data elements and each data structure is associated with exactly one controller. Each data mapping specifies a data source for a data element, where each data mapping is a context mapping or a model mapping. A context mapping binds the data element to another data element. A model mapping specifies a model and a supply function, where the supply function is operable to derive a value of the data element from the model. Each data dependency relationship is directed from a controller to one other controller or to one model. A data dependency relationship is derived whenever there is at least one data mapping between the controller and the other controller of the model.

Advantageous implementations of the invention include one or more of the following features. The system can further include means for receiving user input editing a link, and means for modifying the data dependency relationship specified by the link in accordance with the user input. The data dependency relationship is modified by modifying the data mappings, where the modified data mappings correspond to the user input. The system can further include means for receiving user input requesting a display of a detail view of link having a source and a destination, and means for responding to the user input by displaying all the data mappings having the same source or destination as the link.

The invention can be implemented to realize one or more of the following advantages. Data dependency relationships between controllers encapsulated by a component can be visualized. In addition, data dependency relationships between the controllers and models references by the controllers can be visualized. Data dependency relationships between multiple components can be visualized. The data dependency relationships can be visualized using directed links, where each directed link shows a direction of data dependency. The visualization can be used to get an overview of the data dependencies of a software component. User input editing a link can be received, and the data dependency relationship specified by the link can be modified in accordance with the user input. The data dependency relationship is modified by modifying the data mappings, where the modified data mappings correspond to the user input. In response to received user input requesting a display of a detail view of a link having a source and a destination, all the data mappings having the same source and destination as the link can be displayed. The detail view can identify the data elements having the dependency relationship. Complex data dependency relationships having a large number of links can be filtered using a filter and only data dependency relationships satisfying the filter can be displayed. The data mappings can be filtered using a filter and data dependency relationships derived from data mappings satisfying the filter can be visualized. The invention can be implemented to realize one or more of the following advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
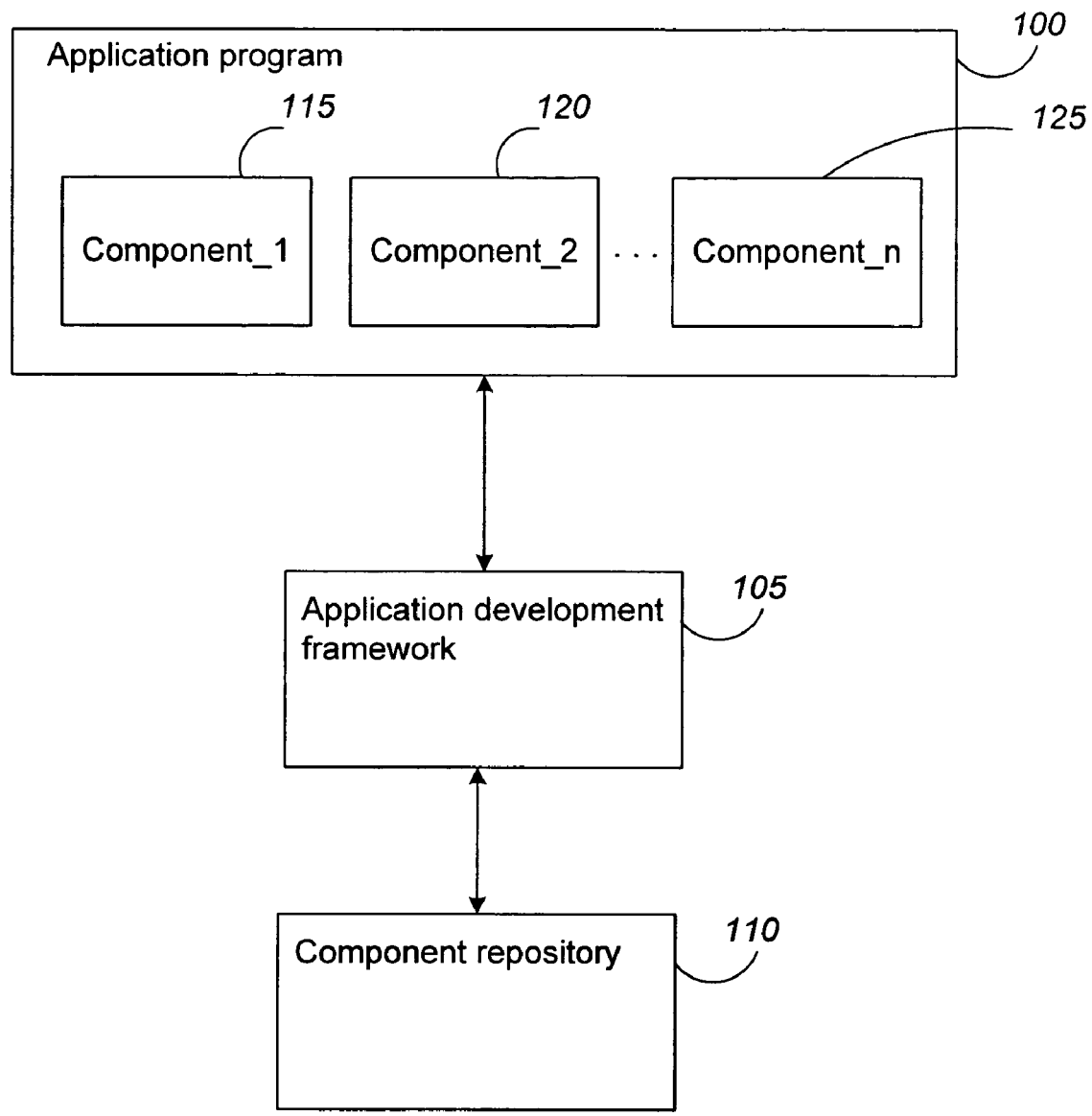
FIG. 1 is a block diagram of a development environment for developing an application program using reusable components.

FIG. 1 is a block diagram of an environment for developing an application program 100 using reusable components. The development environment includes an application development framework 105 and a component repository 110. The application program 100 is developed using reusable components available in the component repository 100, e.g., components 115, 120, and 125. A reusable component in the component repository 110 can have more than one instance, where the component instances are used in multiple application programs. The application program 100 is developed at design time using the application development framework 105.

At runtime, the application runs within a runtime framework that provides the code required to create and manage the instances of the components used by the application program 100. As discussed below, the services provided by the runtime framework include component lifecycle management and managing component event subscriptions.

Figure 2A:
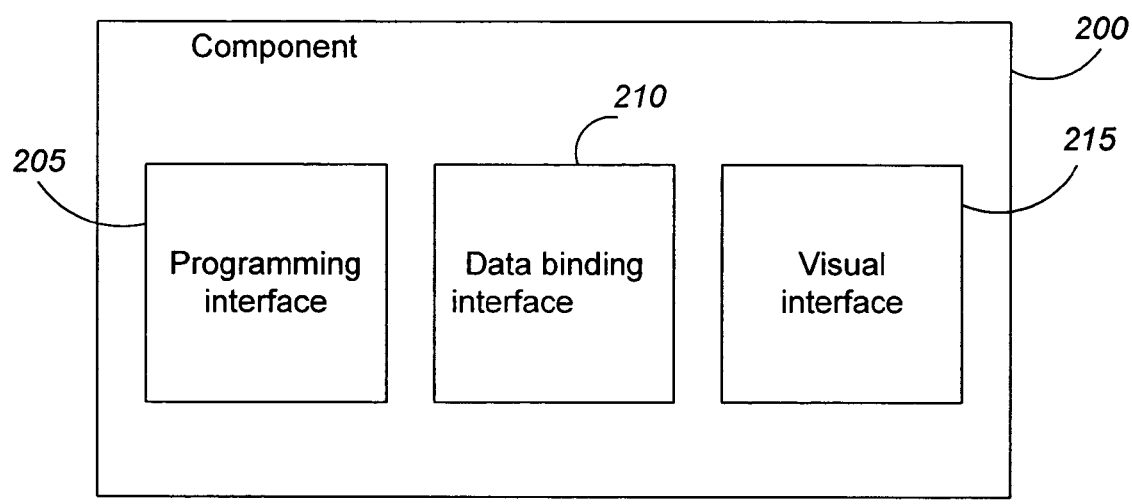
FIG. 2A is a block diagram of a component.

FIG. 2A is a block diagram of a reusable component 200. The reusable component 200 is a reusable entity providing functionality that can be used by many applications (or that can be used multiple times by the same application). Reusable components can be embedded, and they can have one or more visual representations. An application or another reusable component that embeds the reusable component 200 is referred to as a component embedder for the reusable component 200, and the reusable component 200 is referred to as the embedded component.

The reusable component 200 provides three separate interfaces—a programming interface 205, a data binding interface 210, and a visual interface 215. The programming interface 205 is used by the component embedder to interact with the reusable component 200. The programming interface is an active element. The programming component interface is not just a signature. The programming interface defines the component methods that are visible to the component embedder and routes the visible method calls to one or more component implementations. The component embedder interacts with the embedded component 200 by using the programming interface 205, the data binding interface 210, and the visual interface 215. The embedded component 200 can interact with the component embedder by generating events. The component embedder can subscribe to events generated by the embedded component 200, and react to such events.

In one implementation, the programming interface 205 is provided by a controller, referred to as a component interface controller. Thus a component embedder can interact with an embedded component through the interface controller of the embedded component.

The reusable component 200 also has one or more visual representations (which will be referred to as views). As described below, a component embedder can access and use the visual representations of the reusable component 200 (for , example to form its own visual representations) through the visual interface 215.

The data binding interface 210, described below, is used by a component embedder to exchange data with the reusable component 200.

In one implementation, the reusable component 200 encapsulates one or more controllers, one or more associated contexts, and optionally one or more views. The controllers are used to implement the logic of the reusable component, and the views provide a visual representation of the reusable component. A reusable component can include multiple types of controllers, as explained below. The controllers can implement event handlers that are executed in response to an action performed by a user, e.g., pressing a button or making a menu selection. Each controller is bound to an associated context. A context is a local data structure for a controller that stores data and state specific to the controller.

Figure 2B:
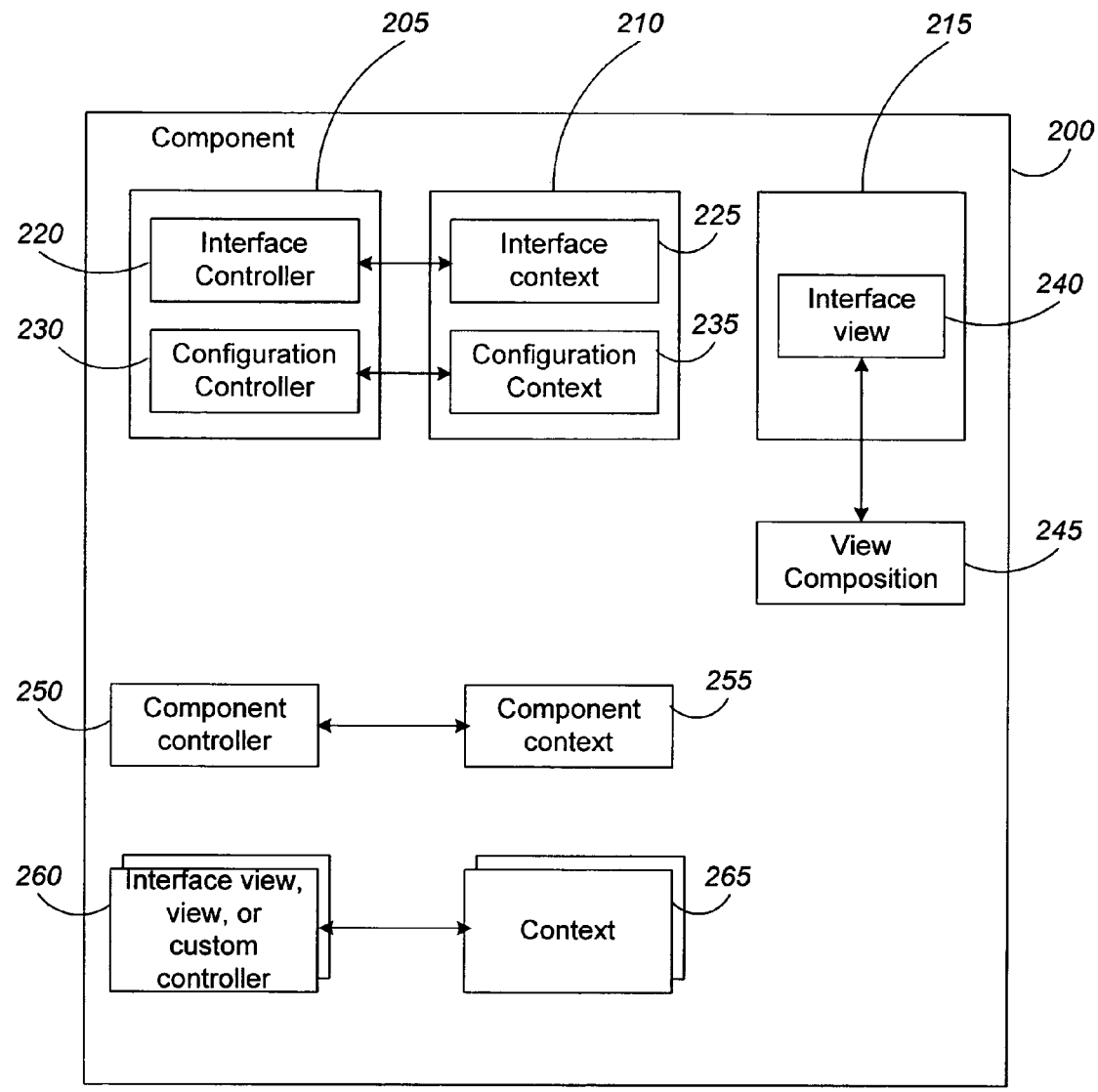
FIG. 2B illustrates further features of a component.

FIG. 2B illustrates further features of a reusable component 200. The programming interface 205 for the reusable component 200 includes an interface controller 220 and a configuration controller 230. The interface controller 220 implements methods that can be used (e.g., by a component embedder) to interact with the reusable component 200. The configuration controller 230 provides access to configuration data for the reusable component 200. The interface controller 220 has an associated interface context 225 that stores data and state for the interface controller 220. The configuration controller 230 has an associated configuration context 235 that stores configuration data for reusable component 200. The component embedder uses the data binding interface 210 to exchange data with the interface context 225 and the configuration context 235. The runtime framework initializes the configuration context 235 when an instance of the reusable component 200 is created at runtime using configuration data provided by the component embedder. The configuration data stored in the configuration context can include data used by the component embedder to customize the reusable component 200, e.g., font size, and selection of fields for a table view.

Figure 4:
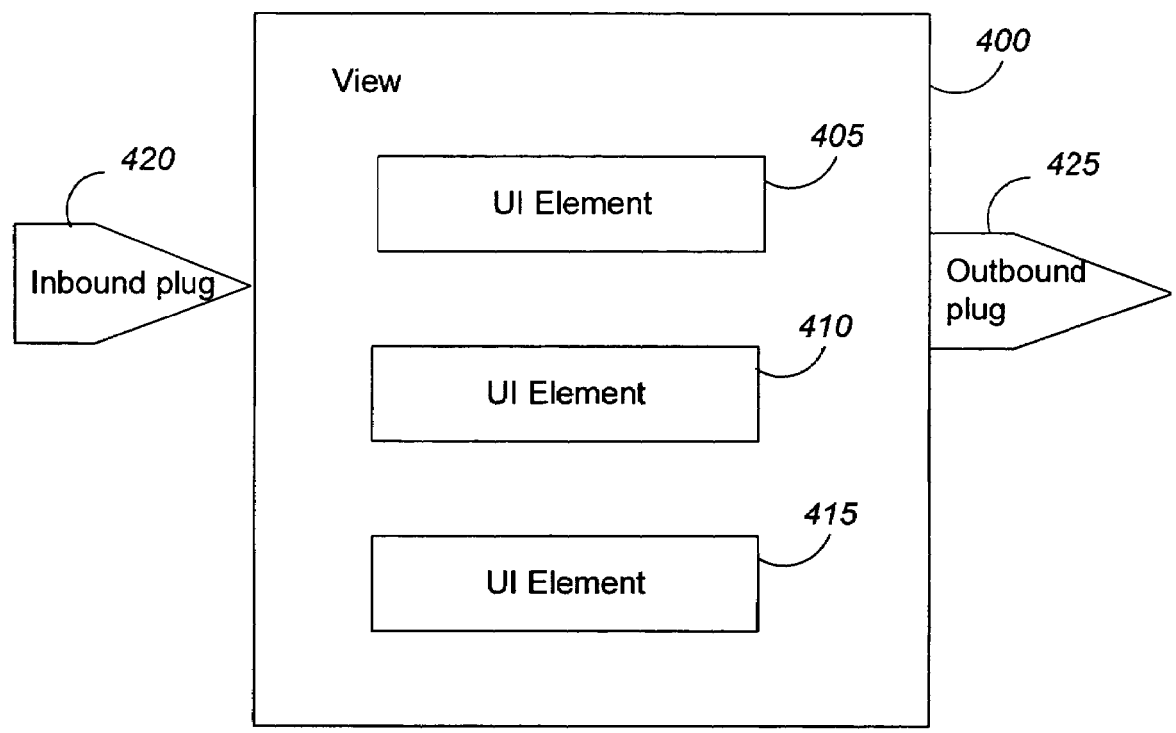
FIG. 4 is a block diagram of a view.

FIG. 4 is a block diagram of a view. A visual interface of a software application is made up of one or more views arranged in a specific layout. A view 400 specifies a layout of at least one user interface element element 405, and a view area. UI elements in a view can include buttons, labels, and menus. The view area defines the area to be occupied by the view 400 in a visual interface embedding the view 400. The UI elements included in the view 400 can include Input UI elements, View UI elements, and Container UI elements. An Input UI element (e.g., a drop down men, an input field, or a table UI element) is used to receive input from a user. A View UI element (e.g., an image view, a text view, or a caption) is used to display application data. A Container UI element (e.g., a scroll container UI element having a scroll bar, or a container UI element specifying a layout for included views), is used to include other views and UI elements.

The visual interface can have more than one view, of which only some views may be visible at any time. The views that are visible in the visual interface can change, e.g., in response to input from the user. Inbound plugs, outbound plugs, and navigation links are design time constructs that are used by an application developer to specify transitions between the views. In one implementation, each view has an inbound plug 420 and an outbound plug 425. At design time, each navigation link establishes a potential transition from the view with the outbound plug 425 to the view with the inbound plug 420. At design time, a transition from a first view to a second view is specified by connecting the outbound plug 425 of the first view to the inbound plug of the second view. The navigation links are processed at runtime to cause the view transitions specified at design time. At run time, the application calls the outbound plug of the first view to cause a transition from the first view to the second view.

Each inbound plug 420 includes an application specific event handler, and calling the inbound plug results in running the event handler for the inbound plug 420 before displaying the view 400 corresponding to the inbound plug 420. Navigation links are typically processed in a runtime framework by calling all the inbound plugs 420 connected to an outbound plug when the outbound plug is called. An event handler for an inbound plug 420 can in turn call the outbound plug 425 for the view corresponding to the inbound plug to cause other views connected to the outbound plug 425 to be displayed. The application can use an event handler for the inbound plug 420 to initialize the corresponding view.

The view 400 can have an associated view controller that includes one or more event handlers associated with the inbound plug. The view controller also contains event handlers for the UI elements in the view, as well as presentation logic for the view. presentation logic can include actions such as triggering events in response to user interaction with user interface elements in the view. The view controller stores data and state in an associated view context. The view context can be used to communicate data between the view controller and another controller by mapping the view context to the context of the other controller (and vice versa).

A component can specify any number of views at design time, any of which can be displayed at runtime. The set of views that can be displayed, for the component or for an application using the component, is referred to as a view composition. A view assembly is a set of views that are actually displayed at runtime. A view assembly, for an application or a component, is made up of views from the view composition that are selected for display at a certain point in time. When a navigation link is processed at runtime, a view in a current view assembly may be replaced by one or more destination views from the view composition.

Figure 5:
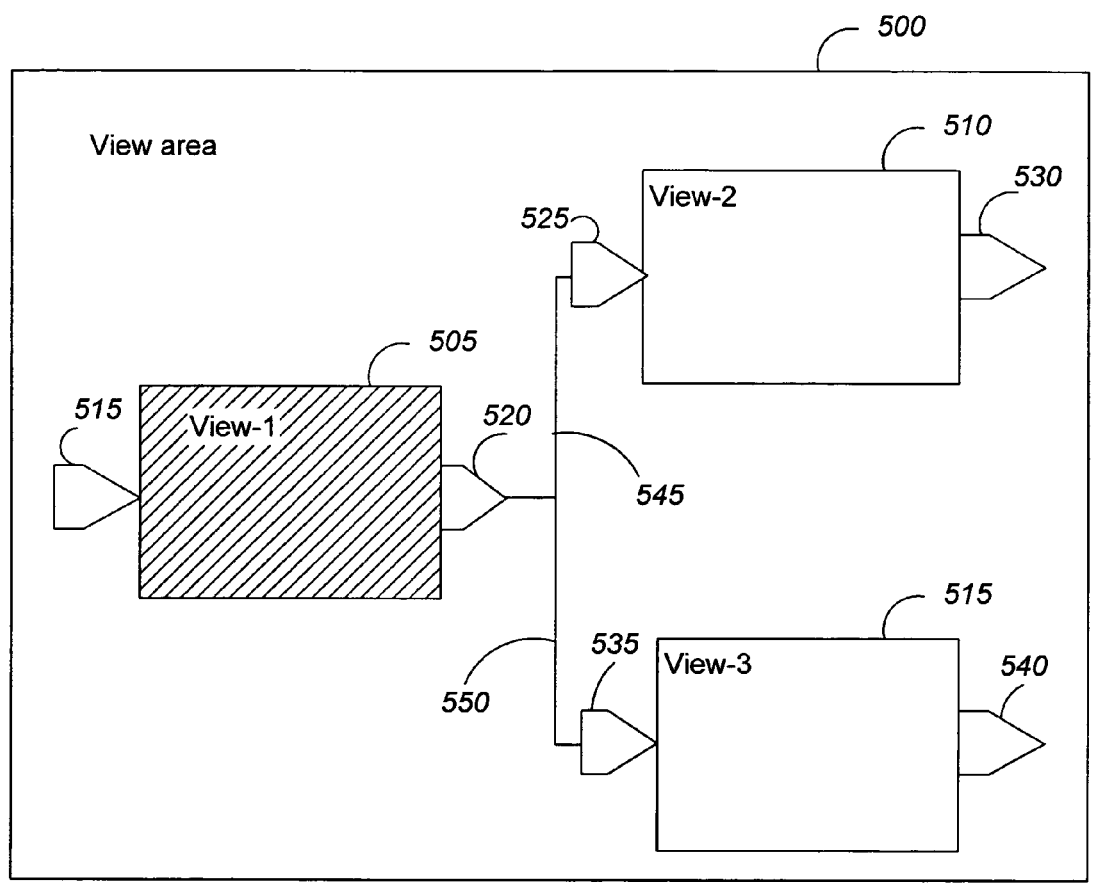
FIG. 5 illustrates a visual interface with multiple views that are linked together using navigation links.

FIG. 5 illustrates a visual interface with multiple views that are linked together using navigation links. Each navigation link connects an inbound plug to an outbound plug. The view area 500 includes three views 505, 510, and 515, of which view 505 is currently displayed in the view area 500. View 505 has inbound plug 515 and outbound plug 520. View 510 has inbound plug 525 and outbound plug 530. View 515 has inbound plug 535 and outbound plug 540. Outbound plug 520 is connected to inbound plug 525 by a navigation link 545, and outbound plug 520 is connected to inbound plug 535 by a navigation link 550. If view 505 activates outbound plug 520 by triggering the specified event for the outbound plug 520, views 510 and 515 are displayed in the view area 500 instead of view 505.

Applications can make use of components that contain view compositions. Components can embed other components, such that a first component can interact with and make use of a second, embedded component. The view composition of the first component can include views from the view composition of the second component. Similarly, the view composition of the application can include views of the components used by the application. In addition, an application developer can design application-specific views that are part of the application's view composition.

A component developer can designate one of the views in the view composition of a component as an interface view 240. In one implementation, the interface view does not have an associated view controller. The interface view 240, and the associated inbound plug and outbound plug, are the visual interface for the reusable component 200. At design time, the component embedder can use navigation links to specify view transitions to the interface views 240 of embedded components 200 like any other view in the view composition of the component embedder. A component can present more than one visual interface by defining more than one interface view.

As shown in FIG. 2B, the reusable component 200 can also include a component controller 250 that implements common functionality required by views implemented by the component. The component controller receives control when the component is instantiated, after the component instance has been initialized. The reusable component 200 can also include one or more custom controllers 260 and associated contexts 265. The custom controllers 260 and associated contexts 265 are used to implement and structure functionality and data storage for the reusable component 200.

Figure 3:
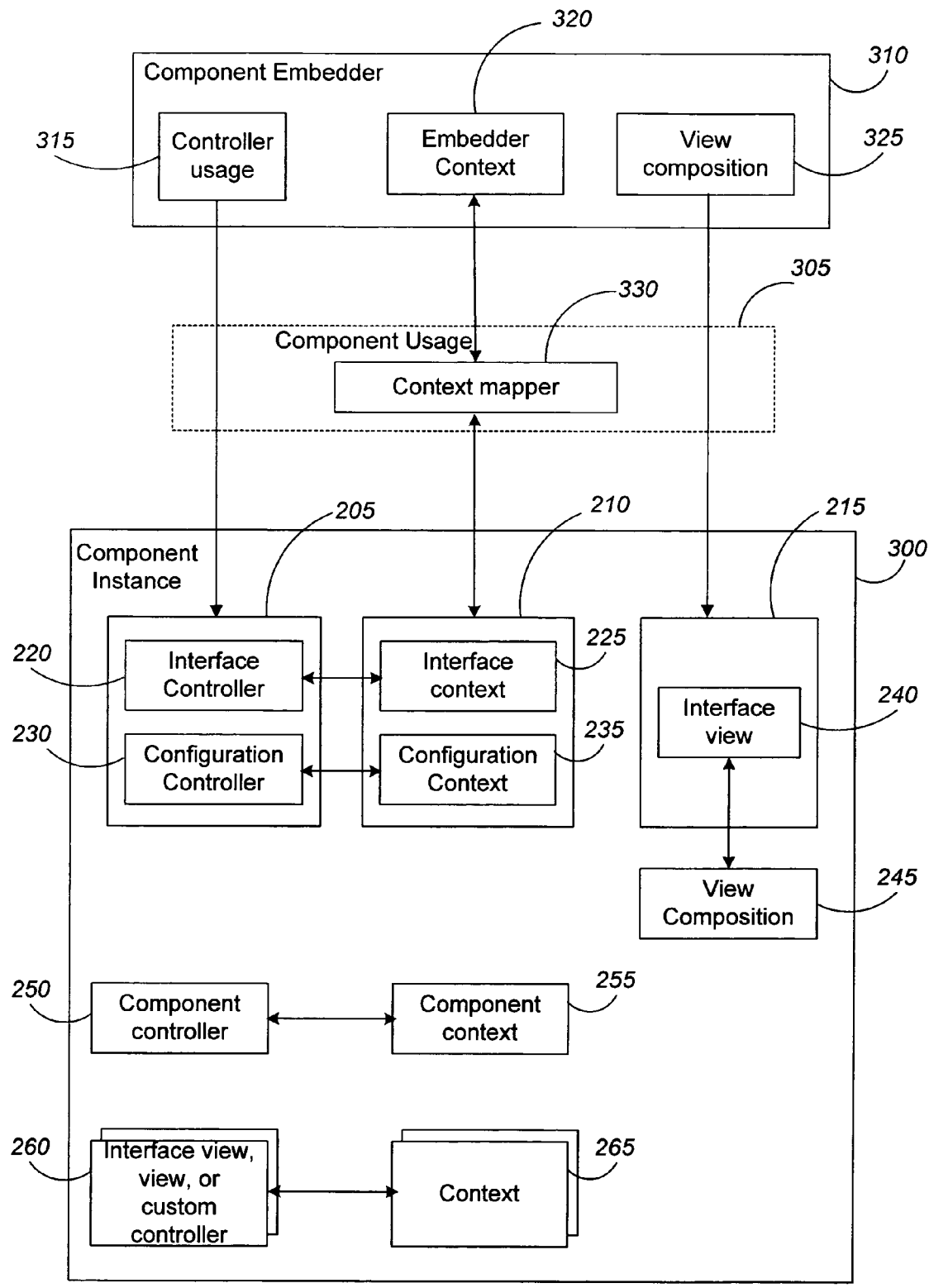
FIG. 3 is a block diagram of a system for accessing an embedded component instance.

FIG. 3 is a block diagram of a component embedder 310 using an instance 300 of a reusable component 200 at runtime. The embedded component instance 300 is generally created at runtime. The embedded component 200 is reusable, and several instances 300 of the embedded component 200 can be used at the same time. In the implementation shown in FIG. 3, a runtime framework provides the services necessary for managing multiple component instances 300. Services provided by the runtime framework include the creation of component instances, e.g., using a component factory method to create component instances, and managing the lifecycle of component instances, e.g., deleting component instances embedded by a component embedder when the component embedder is deleted. Thus, neither the component embedder 310 nor the reusable component 200 needs to include code for managing multiple component instances 300.

Component usage object 305 is an object provided by the application development framework 105 (FIG. 1) to manage multiple component instances. Each component usage object 305 is associated with a component.

The component usage object 305 provides methods that can be used by the component embedder for life-cycle management of the associated reusable component 200. At design time an application programmer can program an application using a programming interface for a component without specifying a particular implementation of the component. At run time, the component embedder 310 creates a component instance 300, that implements the component programming interface used by the component embedder by calling methods provided by the component usage object 305. The component usage object 305 responds to requests to create a component instance by selecting a component in the repository 110 that implements the desired programming interface and creating an instance of the selected component. Alternatively, if the application programmer specifies a component implementation at design time, an instance of the specified component can be created and used at runtime.

A context is a local data structure for a controller that stores data and state specific to the controller. Controllers within a component, e.g., the interface controller, the configuration controller, the component controller, custom controllers, and view controllers, can communicate or share data with each other through the use of mappings (e.g., through the mapping of one or more data elemetns from a first context to a second context). For example, the component embedder 310 can share data with the embedded component instance 300 by mapping (elements of) one or more contexts from the component embedder 310 to (elements of) the interface context 225 or the configuration context 235 using the context mapper 330.

Figure 6:
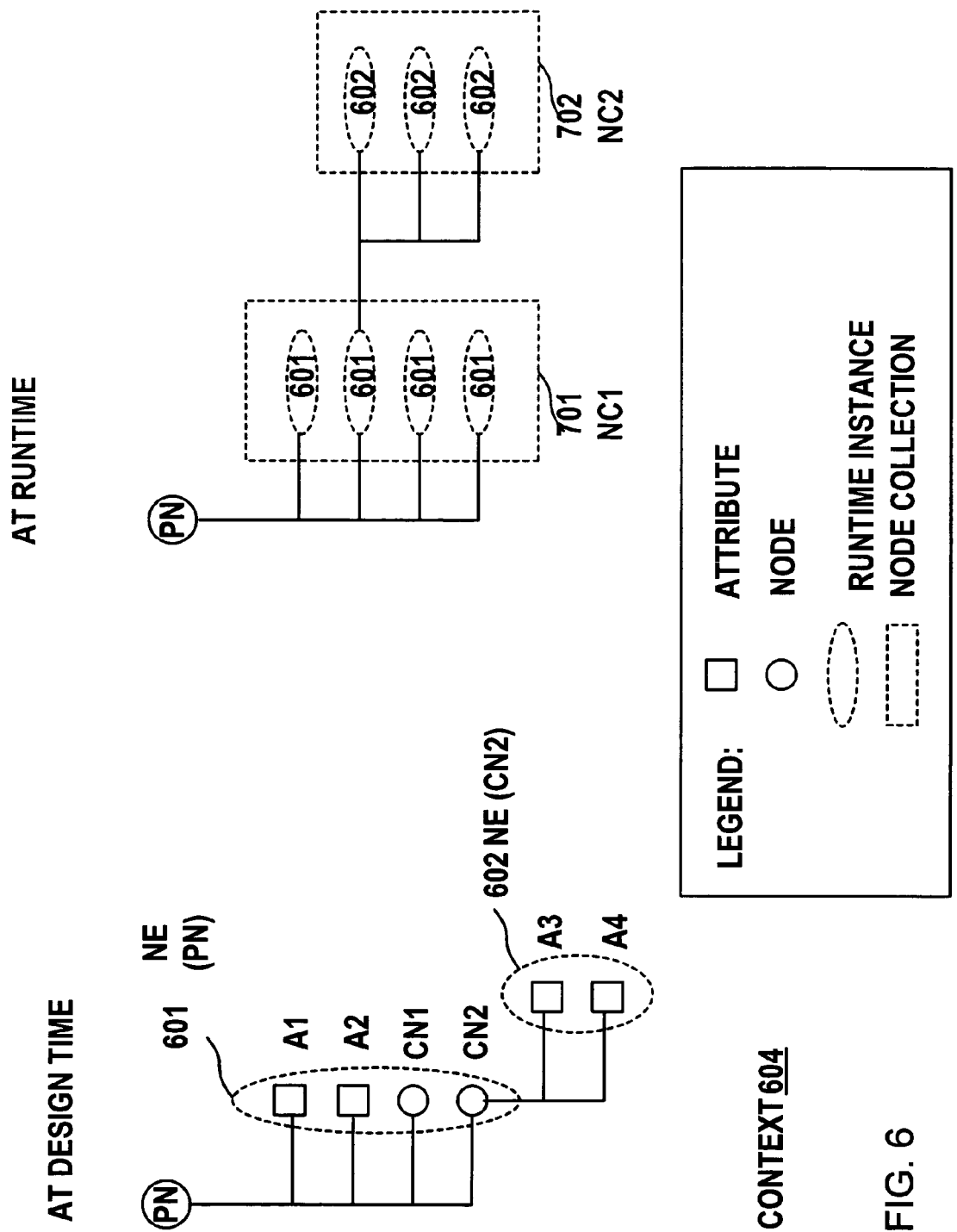
FIG. 6 illustrates an example of a structure of a context at design time and at runtime.

FIG. 6 illustrates an implementation of a context 604 at design time and at runtime. As shown in the example in FIG. 6, the design time context structure can be different from the runtime context structure.

In the example in FIG. 6, the design time context structure is a node hierarchy containing nodes and attributes. The root-node of the node hierarchy represents the context itself. The child nodes of the root node can be defined by the application. Child nodes of the root node will be referred to as independent nodes. Child nodes of independent nodes depend on their corresponding parent node and will be referred to as dependent nodes.

In one implementation, a node can be either a value node or a model node. A value node maintains, that is, stores and administers, its own application data (e.g., transient application data). The data can be, for example, scalar data, tables or structures. A model node includes a reference to application data that persists in a corresponding model.

A node (e.g., a parent node) can store data in attributes. Each child node can include an arbitrary tree structure that includes further child nodes and/or attributes. Attributes are leaves in the tree structure. Attributes represent, for example, scalar data types, such as strings and integers, or Java types (e.g., java.util.Date).

In FIG. 6, at design time, the context 604 includes the independent node PN that has two attributes A1, A2 and that is the parent node of the dependent nodes CN1, CN2. The second dependent node CN2 has two further attributes A3, A4. This structure defines a first node element 601 for the parent node PN, and a second node element 602 for the second child node CN2. The first node element 601 includes information about the context structure with regards to the parent node PN. In other words, it describes the constituent elements of the parent node PN. The second node element 602 includes information about the context structure with regards to the second dependent node CN2—that is, it describes the constituent elements of the child node CN2. The structure of the context hierarchy shows that the second node element 602 (which corresponds to the child node CN2) depends on the first node element 601 (which corresponds to the parent node PN).

At runtime, the structure elements of a context (e.g., nodes) can be represented as a set of data instances. Nodes provide type information about data instances that are maintained by the node. Each node can have a node collection, wherein each element of the node collection has the same type.

For example, in FIG. 6, at runtime, the parent node PN corresponds to a first node collection 701 that includes multiple runtime instances of the first node element 601. Each runtime instance of the first node element 601 can have the attributes A1 and A2, a node collection corresponding to child node CN1, and a node collection corresponding to child node CN2. An example of the latter node collection is shown in FIG. 6 as node collection 702, which contains multiple runtime instances of the second node element 602. A node collection can be empty, or can have at least one instance of the corresponding node element.

A node collection can have a cardinality and a node collection type, such as list, tree, set, or collection. The node collection cardinality (see, e.g., Table 2) and the node collection type (see, e.g., Table 1) can be declared at design time. An evaluation mechanism can be used to automatically evaluate (provides values for) the node collection of a child node at runtime when its parent node changes.

TABLE 1

Examples of Node Collection Types

| Value | Properties |
|---|---|
| Collection | forward-only iterator (cursor) without absolute positioning |
| Set | no duplicates, forward-only iterator without absolute positioning |
| List | duplicates allowed, position available, list iterator, absolute positioning (indexed access) |

The application can use the cardinality of a node collection to restrict possible operations on a node (e.g., prohibit indexed access to a node that has at most one node collection element).

TABLE 2

Examples of the Cardinality of a Node Collection

| Value | Properties |
|---|---|
| 0 . . . 1 | node collection can be empty, contains at most one element |
| 1 . . . 1 | node collection always contains exactly one element. |
| 0 . . . n | node collection can be empty or contain any number of elements |
| 1 . . . n | node collection always contains at least one element. |

The content of a node collection can be determined in various ways.

The node values of independent nodes can be set by initializers, event handlers, or supply functions. A supply function can be called when a node is accessed. A node, is accessed for example, when the node is queried for its data by application code or by a user interface element that is bound to the node.

Dependent nodes can get their values by using a supply function. For example, the node collection of a dependent node can become obsolete when a selection of its parent node changes (i.e., when a different element is selected from the node collection corresponding to the parent node). In this scenario the dependent node can be recalculated, that is, the content of its node collection can be determined, on a subsequent access. In another example, a representation instance is created for each dependent node of a parent node. The values of the representation instances are calculated when the corresponding parent node is accessed. In other words, using representation instances enables a "load data on demand" or a "unload data when not needed" mechanism. In this manner, memory can be used in an efficient manner.

The content of a node collection can also be explicitly set to a certain state, such as "invalid" or "unfilled". When the node that corresponds to the node collection is subsequently accessed, the node collection content is determined again. This can be used to force a re-read of modified data when the modification (e.g., in the model) was not visible to the application runtime.

Figure 7:
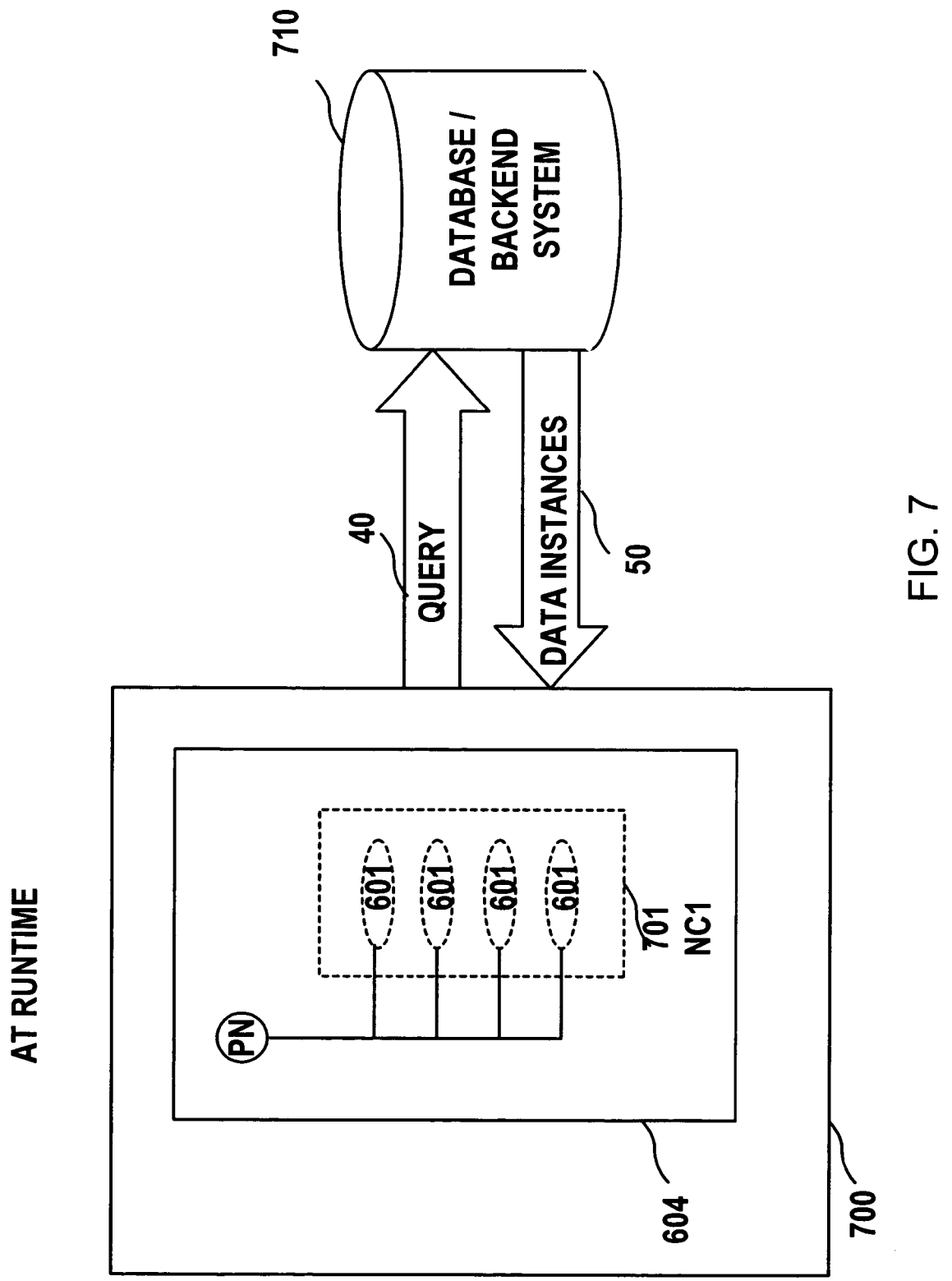
FIG. 7 illustrates a context at runtime as a set of data instances.

FIG. 7 illustrates the context 604 at runtime as a set of data instances. The nodes of the context at runtime represent a system-managed set of data instances (e.g., a java.sql.RecordSet). The data instances can be provided 50, for example, from a database or backend system 710 in response to a query (e.g., a structured query language (SQL) query) that is sent 40 from the computer system 700 to the database/backend system 710 when a node is accessed, for example, by an application. Examples of backend systems include Enterprise Resource Planning systems, Customer Relationship Management systems, web server systems providing web services or any other system that stores application data.

Accessing a node can lead to a request for data from a corresponding model. This can result in a corresponding query request from the model to a database/backend system 710. Nodes provide type information about object instances that are maintained by the node. The type information can be derived from a model. For example, if a parent node PN corresponds to a customer, its child node collection 702 (shown in the example in FIG. 6) can include all orders for customer. When the an application accesses the parent node PN (which represents the customer), the computer system 700 can send 40 a query to retrieve all orders of the customer from the corresponding database/backend system 710, such as a sales and distribution (SD) system or a customer relationship management (CRM) system. The retrieved orders (data instances) are then returned 50 to the computer system 700 to fill the corresponding data of elements of the node collection 702 in the context 604.

Figure 8:
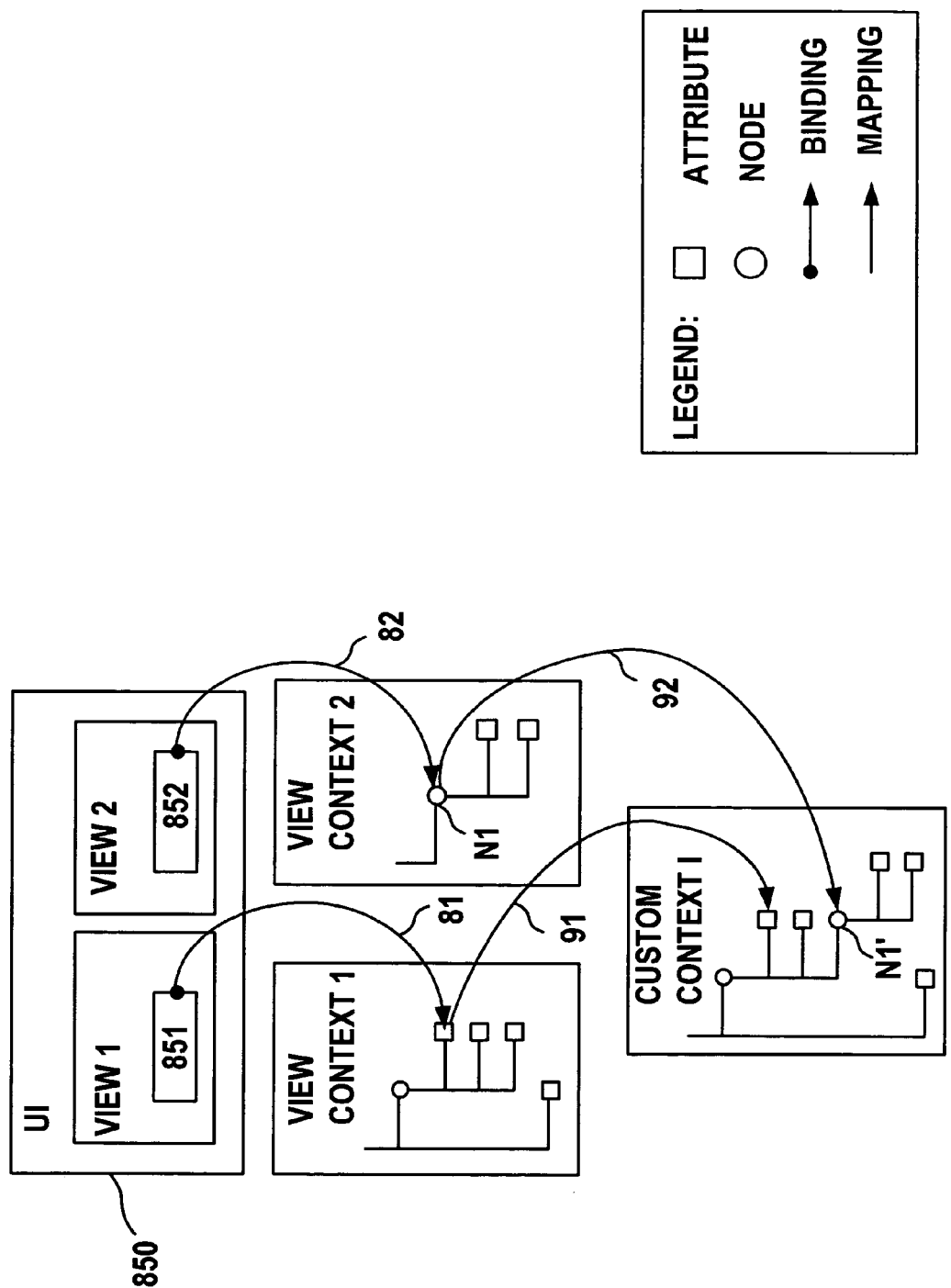
FIG. 8 illustrates mappings between contexts.

FIG. 8 illustrates mappings between contexts according to the present invention.

In the example in FIG. 8, UI elements (e.g., UI elements 851, 852) of views (e.g., VIEW 1, VIEW 2) that are used in a user interface 850 are bound 81, 82 to context elements in the corresponding view contexts (e.g., VIEW CONTEXT 1, VIEW CONTEXT 2). However, data (e.g., data that needs to be shown in multiple views) can reside in custom contexts (e.g., CUSTOM CONTEXT I). To enable such data to be accessed without copying or transferring the data between contexts, one implementation of components enables mapping (e.g., mappings 91, 92) of nodes and attributes from one context to nodes and attributes of another contexts. In other words, nodes and attributes in one context can reference type-compatible nodes and attributes in another context. Nodes can also be mapped to other nodes within the same context. Node mapping reduces the need for copying data between different contexts by enabling a node N1 of a first context (e.g., a view context, such as VIEW CONTEXT 2, or a custom context) to reference 92 a node N1' of a second context (e.g., a custom context, such as CUSTOM CONTEXT I, or an application context), where the node N1' of the second context has or references the data. The same applies to attributes.

In this manner, data can be stored and manipulated in one custom context or application context (the source context), and each view context that references the custom context or application context can provide its view with the current data stored in thesource context. Mappings can span multiple context levels. That is, a context that is mapped to can reference a further context. In this way, context hierarchies can be created (see, e.g., FIG. 8).

This allows, related data to be collected in a dedicated custom context. The binding to this data can be implemented by using a view context that is mapped to the custom context accordingly.

In one implementation, a component encapsulates one or more controllers, a controller generally has an associated context, and a context is a hierarchical data structure of data elements. Data elements can be bound by data mappings. The term data mapping will be used to refer to either a context mapping or a model mapping. A data mapping is a context mapping if the data source for the data element is another data element, and a data mapping is a model mapping if the data element is a model node deriving its value from a model. Each model mapping specifies a model and a supply function referring to the specified model.

In one implementation of a development environment, datalinks are used to visualize data dependency relationships between a controller and another controller or a model. Each datalink indicates a direction of the data dependency and represents all the data mappings in the indicated direction. The datalink can be represented as a directed arrow, with the head of the arrow indicating the source of the data and the tail of the arrow indicating the controller that is dependent on the source of the data.

Figure 9A:
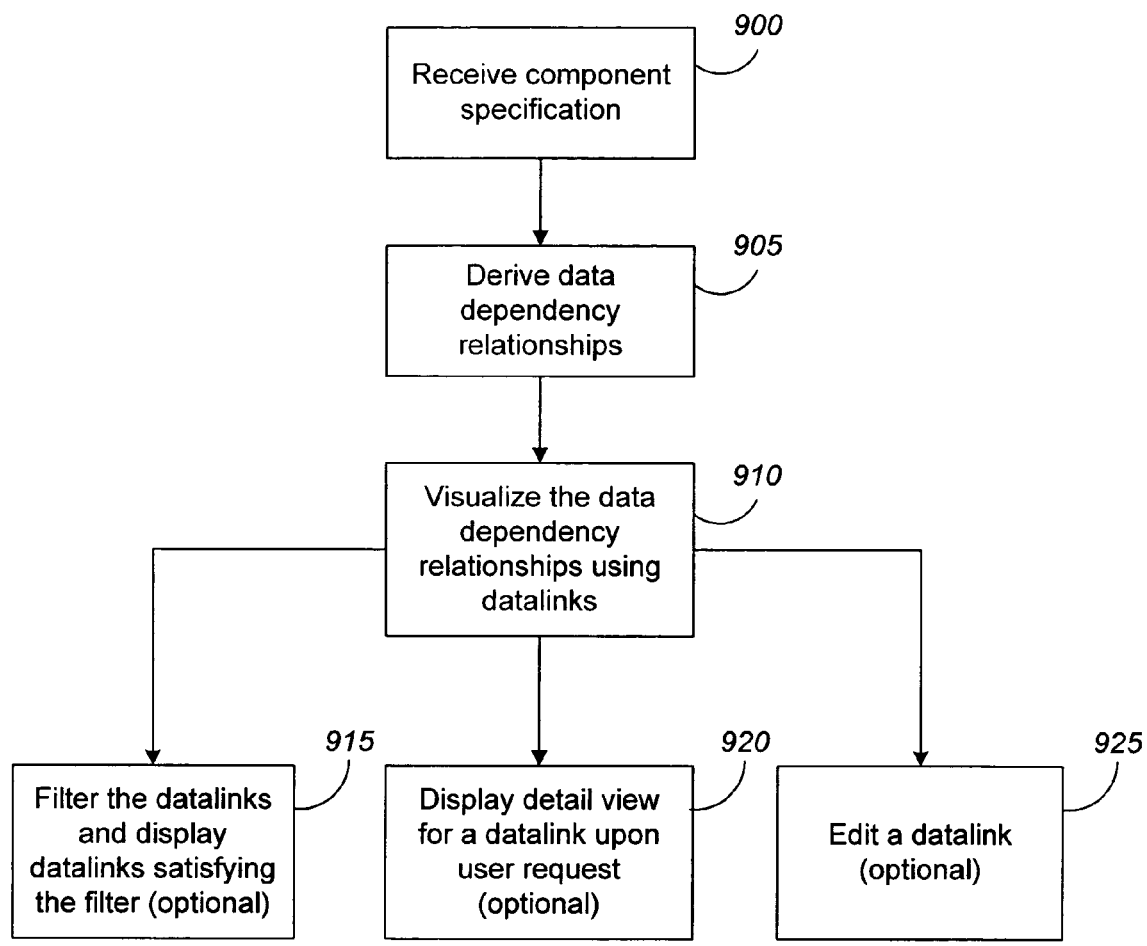
FIG. 9A is a flow diagram illustrating a method for visualizing data dependency relationships using datalinks.

FIG. 9A is a flow diagram illustrating a method for visualizing the data dependency relationships that can be implemented in a data processing system. A specification of the component is received, including all the data mappings for the component (step 900). The data dependency relationships for the component are derived from the data mappings (step 905). A data dependency relationship in a direction exists between two controllers if there is at least one data mapping in the direction between the associated contexts of the two controllers. A data dependency relationship exists from a controller to a model if there is at least one model node in the associated context of the controller and a value of the model node is derived from the model. Multiple data mappings in a direction are represented as a single data dependency relationship in the direction. The data dependency relationships are visualized by displaying a datalink for each data dependency relationship (step 910). Each datalink shows the direction of data dependency.

For complex data dependency relationships having a large number of datalinks, a user can optionally filter the datalinks using different filters, and the filtered datalinks can be visualized (step 915). For example, a user can display all the datalinks between a number of user selected models and controllers. In an alternative example, the user can display all the datalinks having a selected model or controller as the source or the selected controller as the destination. In one implementation the user specifies filters for the data mappings, the filtered data mappings satisfying the filter are used to derive filtered datalinks, and the filtered datalinks are visualized. For example, the data mapping filters can specify all data mappings having selected models or controllers as the data source. In an alternative example, the data mapping filters can specify all data mappings having a selected model or controller as the data source, and all data mappings specifying a data source for the selected controller.

Figure 9B:
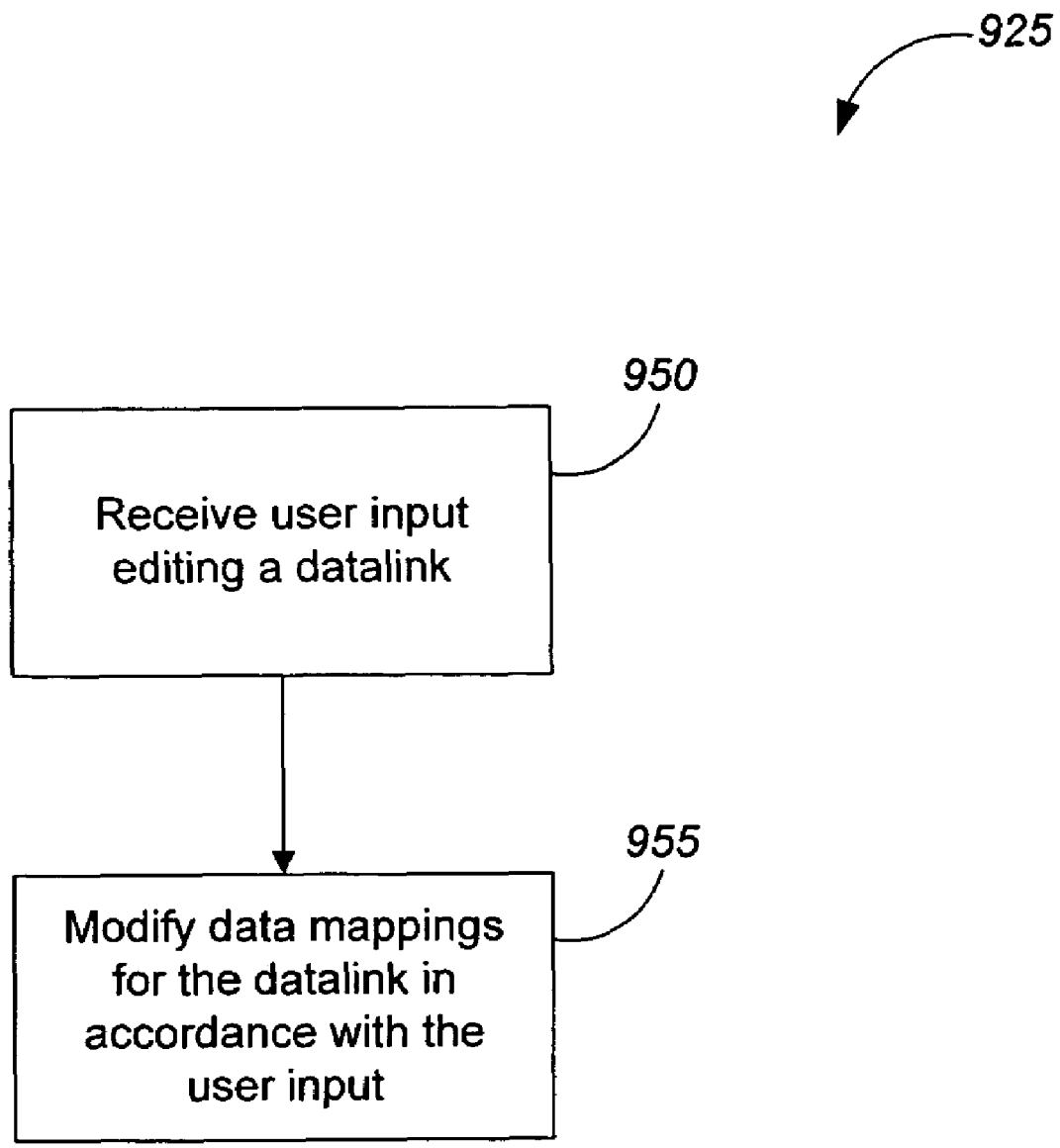
FIG. 9B is a flow diagram illustrating a method for editing a datalink.

A user can optionally edit a datalink to modify the data dependency relationship represented by the datalink (step 925). FIG. 9B is a flow diagram illustrating a method for editing a datalink. User input is received editing the datalink (step 950), and the data dependency relationships specified by the datalink are modified in accordance with the user input (step 955). The data dependency relationships are modified by modifying the data mappings represented by the data dependency relationship. The user can change the direction of the data link thereby changing the direction of the data dependency. The user can also move the source end of the datalink from one controller to another controller or from one model to another model. If the source end is moved from one controller to another controller, the data mappings are modified to map to the associated context for the second controller. If there is more than one option for the modified data mapping, all the possible data mappings are displayed and the user is prompted to select the desired data mapping. If the source end is moved from a model to another model, the data mapping is modified to refer to the second model. If the second model does not support the supply function used by the data mapping, the user is prompted to provide a new supply function for the modified data mapping.

A user can optionally request that a detail view be displayed for a datalink (step 920). For a datalink between two controllers, the detail view displays all the context mappings between associated contexts for the two controllers. For a datalink between a controller and a model, the detail view displays the supply functions referring to the model for all the model nodes in the associated context of the controller.

Figure 10:
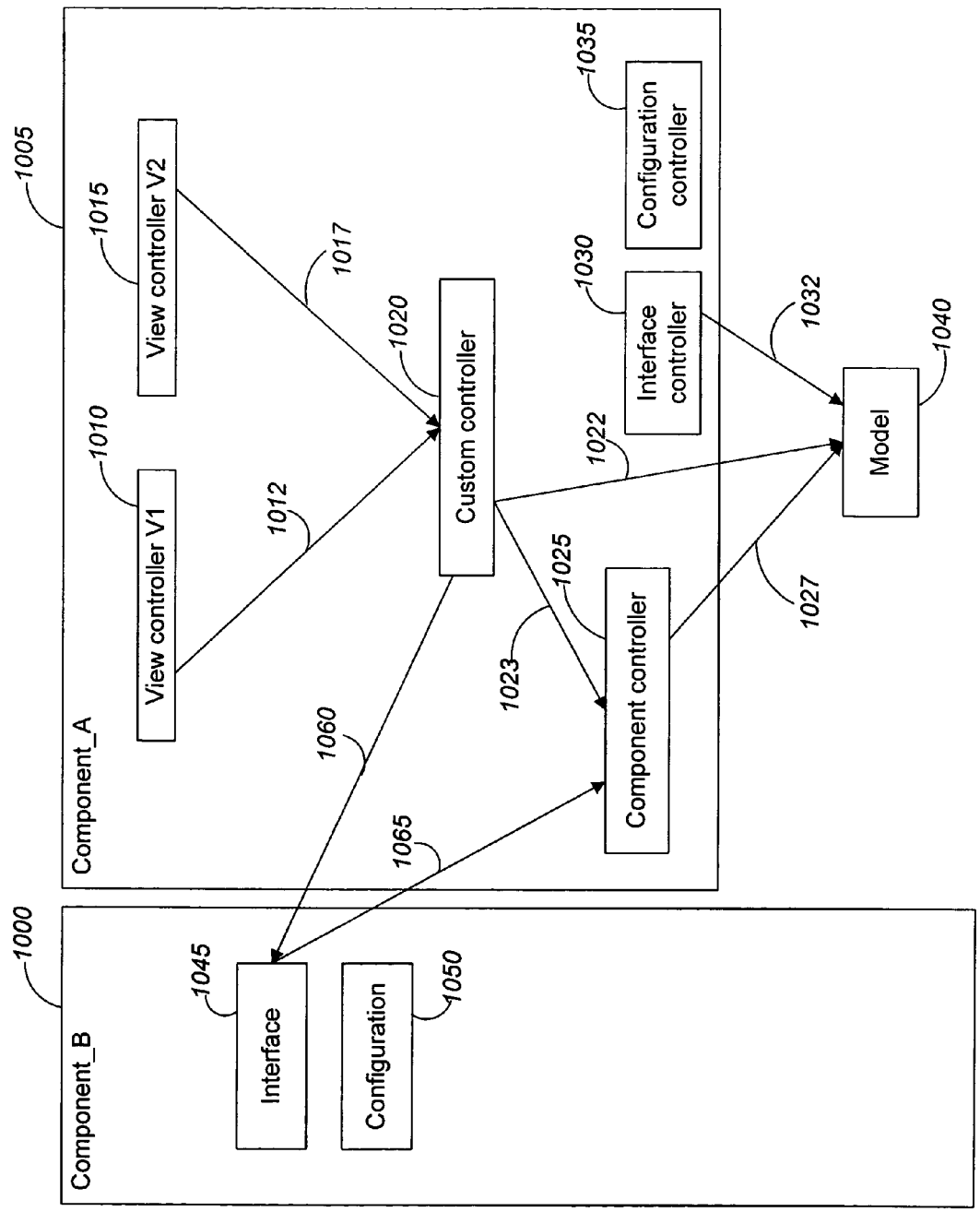
FIG. 10 is a diagram showing a visualization of datalinks for a component.

FIG. 10 is a diagram illustrating a visualization of the data dependencies for a component. The component Component_A 1005 has two view controllers V1 1010, and V2 1015. Component_A 1005 has a custom controller 1020, and a component controller 1025. The programming interface for Component_A 1005 includes an interface controller 1030 and a configuration controller 1035. The view controllers V1 1010 and V2 1015 have data dependency relationships with the custom controller 1020 as indicated by the datalinks 1012 and 1017. The custom controller 1020 has data dependency relationship with the model 1040, indicated by the datalink 1022. The component controller 1025 has a data dependency relationship with the model 1040, indicated by the datalink 1027. The custom controller 1020 has a data dependency relationship with the component controller 1025, indicated by datalink 1023. The interface controller has a data dependency relationship with the model 1040, indicated by datalink 1032.

The visualization diagram can be used to visualize data dependency relationships between multiple components. In FIG. 10, Component_B 1000 is a component that is embedded by Component_A 1005. Component_B 1000 includes an interface controller 1045 and a configuration controller 1050. Datalink 1060 indicates a data mapping from the custom controller 1020 to the embedded component's interface controller 1045. Datalink 1065 indicates a data mapping from the embedding component's interface controller 1045 to the component controller 1025. A data mapping from an embedded component to an embedding component is referred to as a reverse mapping.

Figure 11:
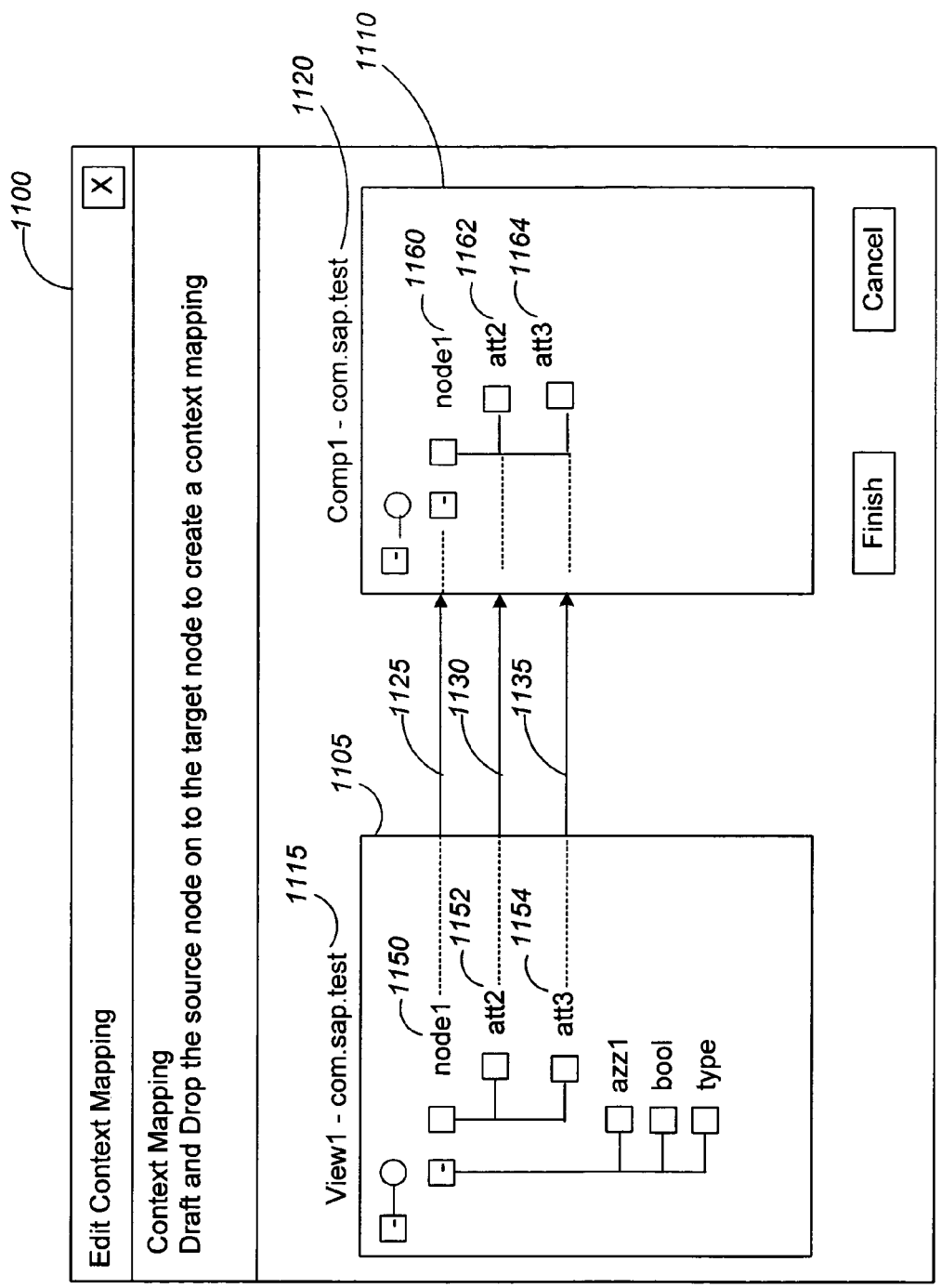
FIG. 11 is an example of a user interface that is used to display and edit datalinks.

FIG. 11 is an example of a user interface 1100 that is used to display a detail view for a datalink and to edit a datalink. The user interface 1100 shows a view controller context 1105 associated with a view controller View1 1115 and a controller context 1110 associated with a component controller Comp1 1120. The user interface 1100 is displayed when a user requests a detail view for a data link between the view controller View1 1115 and the component controller Comp1 1120. The user interface 1100 displays nodes and attributes contained in the view controller context 1105 and the component controller context 1110. In addition, the user interface 1100 displays the data mappings between the two contexts. Each data mapping is represented by an arrow, where the direction of the arrow shows the direction of the data mapping. For example, the arrow 1125 indicates a data mapping from a node (node1 1150) of view context 1105 to a node (node1 1160) of controller context 1110. The arrow 1130 indicates a data mapping from an attribute (att2 1152) of view context 1105 to an attribute (att2 1162) of controller context 1110. The arrow 1135 indicates a data mapping from an attribute (att3 1154) of view context 1105 to an attribute (att3 1164) of controller context 1110.

The user interface 1110 is optionally used by the user to edit the datalink between the view controller View1 1115 and the component controller Comp1 1120. The user can edit the datalink by editing the data mappings between the view controller context 1105 and the controller context 1110. For example, the user can create a new data mapping using drag and drop operations to drag a node or attribute from one context to a node or attribute of the other context displayed in the user interface 1100. As another example, the user can also delete a selected data mapping displayed in the user interface 1100.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer-readable storage medium containing instructions operable to cause data processing apparatus to:

receive a specification of two or more controllers, each controller having at least one associated data structure of data elements, each data structure being associated with exactly one controller, and one or more data mappings, each data mapping specifying a data source for a data element, each data mapping being a context mapping or a model mapping, each context mapping binding the data element to another data element, each model mapping specifying a model and a supply function, the supply function being operable to derive a value of the data element from the model;

derive one or more data dependency relationships from the data mappings, each data dependency relationship being directed from a first controller to a second controller and from the second controller to one model, one data dependency relationship being derived whenever there is at least one data mapping between the first controller and the second controller and between the second controller and the model; and visualize the data dependency relationships directed from the first controller to the second controller and from the second controller to the model by displaying a link for each of one or more data dependency relationships, each link showing a direction of data dependency.

2. The computer-readable storage medium of claim 1, wherein the data structure is a tree.

3. The computer-readable storage medium of claim 1, wherein the instructions to receive a specification comprise instructions to receive a specification of a component encapsulating the controllers and including the mappings, and wherein the controllers comprise at least one interface controller and at least one view controller.

4. The computer-readable storage medium of claim 3, wherein the controllers further comprise a configuration controller, a component controller, or a custom controller.

5. The computer-readable storage medium of claim 1, further comprising instructions to:

receive user input editing a first link; and modify the data dependency relationship specified by the first link in accordance with the user input, the data dependency relationship being modified by modifying the data mappings, wherein the modified data mappings correspond to the user input.

6. The computer-readable storage medium of claim 5, wherein the first link has a source end, the source end specifying the source of data for the data dependency relationship, and the instructions to receive the user input comprise instructions to:

receive user input moving the source end of the first link from a first data source to a second data source, the first and second data source each being one of the controllers or models.

7. The computer-readable storage medium of claim 5, wherein the instructions to receive the user input cause the data processing equipment to:
receive user input changing the direction of the data dependency relationship for the first link.

8. The computer-readable storage medium of claim 1, further comprising instructions to:
receive user input requesting a display of a detail view of a second link, the second link having a source and a destination; and
respond to the user input by displaying all the data mappings that have the same source and destination as the second link.

9. The computer-readable storage medium of claim 1, further comprising instructions to:
receive user input to filter the displayed links using a filter; and display only data dependency relationships satisfying the filter.

10. The computer-readable storage medium of claim 9, wherein the filter specifies all data dependency relationships having selected models or controllers as the source.

11. The computer-readable storage medium of claim 9, wherein the filter specifies all data dependency relationships having a selected controller as the source or the destination, or having a selected model as the source.

12. The computer-readable storage medium of claim 1, further comprising instructions to:
receive user input to filter the data mappings using a filter;
derive one or more filtered data dependency relationships from the data mappings satisfying the filter; and
visualize the filtered data dependency relationships.

13. The computer-readable storage medium of claim 12, wherein the filter specifies all data mappings having selected models or controllers as the data source.

14. The computer-readable storage medium of claim 12, wherein the filter specifies all data mappings having a selected controller or model as the data source, and all data mappings specifying a data source for the selected controller.

15. A system comprising:
a processor;
means, connected to the processor, for receiving a specification of a component, wherein the component encapsulates two or more controllers, each controller having at least one associated data structure of data elements, each data structure being associated with exactly one controller, the component including one or more data mappings, each data mapping specifying a data source for a data element, each data mapping being a context mapping or a model mapping, each context mapping binding the data element to another data element, each model mapping specifying a model and a supply function, the supply function being operable to derive a value of the data element from the model;
means for deriving one or more data dependency relationships from the data mappings, each data dependency relationship being directed from a first controller to a second controller and from the second controller to one model, one data dependency relationship being derived whenever there is at least one data mapping between the first controller and the second controller and between the second controller and the model; and
means for visualizing the data dependency relationships directed from the first controller to the second controller and from the second controller to the model by displaying a link for each of one or more data dependency relationships, each link showing a direction of data dependency.

16. The system of claim 15, further comprising:
means for receiving user input editing a link; and
means for modifying the data dependency relationship specified by the link in accordance with the user input, the data dependency relationship being modified by modifying the data mappings, wherein the modified data mappings correspond to the user input.

17. The system of claim 15, further comprising:
means for receiving user input requesting a display of a detail view of a link, the link having a source and a destination; and
means for responding to the user input by displaying all the data mappings that have the same source and destination as the link.

18. A method comprising the steps, performed by a computer processor, of:
receiving a specification of a component, wherein the component encapsulates two or more controllers, each controller having at least one associated data structure of data elements, each data structure being associated with exactly one controller, the component including one or more data mappings, each data mapping specifying a data source for a data element, each data mapping being a context mapping or a model mapping, each context mapping binding the data element to another data element, each model mapping specifying a model and a supply function, the supply function being operable to derive a value of the data element from the model;
deriving one or more data dependency relationships from the data mappings, each data dependency relationship being directed from a first controller to a second controller and from the second controller to one model, one data dependency relationship being derived whenever there is at least one data mapping between the first controller and the second controller and between the second controller and the model; and
visualizing the data dependency relationships directed from the first controller to the second controller and from the second controller to the model by displaying a link for each of one or more data dependency relationships, each link showing a direction of data dependency.

19. The method of claim 18, further comprising: receiving user input editing a link; and
modifying the data dependency relationship specified by the link in accordance with the user input, the data dependency relationship being modified by modifying the data mappings, wherein the modified data mappings correspond to the user input.

20. The method of claim 18, further comprising:
receiving user input requesting a display of a detail view of a link, the link having a source and a destination; and
responding to the user input by displaying all the data mappings that have the same source and destination as the link.

21. A computer-readable storage medium containing instructions operable to cause data processing apparatus to:
receive a specification of two or more controllers, each controller having at least one associated data structure of data elements, each data structure being associated with exactly one controller, and one or more data mappings, each data mapping specifying a data source for a data element;

display a link for each of one or more data dependency relationships, each data dependency relationship being directed from a first controller to a second controller and from the second controller to one model, each data dependency relationship indicating that there is at least one data mapping between the first controller and the second controller and between the second controller and the model and representing all the data mappings in the same direction between the first controller and the second controller and between the second controller and the model, each link showing the direction of data dependency;

receive user input editing a first link; and modify the data mappings represented by the data dependency relationship specified by the first link in accordance with the user input.

* * * * *